United States Patent
Boshra (10) Patent No.: US 9,928,355 B2
(45) Date of Patent: Mar. 27, 2018

(54) BACKGROUND ENROLLMENT AND AUTHENTICATION OF A USER

(71) Applicant: Apple Inc., Cupertino, CA (US)

(72) Inventor: Michael Boshra, Melbourne, FL (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 15/075,676

(22) Filed: Mar. 21, 2016

(65) Prior Publication Data

US 2016/0203306 A1 Jul. 14, 2016

Related U.S. Application Data

(63) Continuation-in-part of application No. 14/022,110, filed on Sep. 9, 2013, now abandoned.

(51) Int. Cl.
*H04L 29/06* (2006.01)
*G06F 21/32* (2013.01)
(Continued)

(52) U.S. Cl.
CPC ........ *G06F 21/32* (2013.01); *G06F 17/30259* (2013.01); *G06F 17/30265* (2013.01);
(Continued)

(58) Field of Classification Search
CPC ............... G06F 21/32; G06F 17/30259; G06F 17/30265; G06F 2221/2117; G06K 9/02; G06K 9/87; G06K 9/6218; G07C 9/158
See application file for complete search history.

(56) References Cited

U.S. PATENT DOCUMENTS 4,322,795 A 3/1982 Lange et al.
5,363,453 A * 11/1994 Gagne ................ G06K 9/00006
382/125

(Continued)

FOREIGN PATENT DOCUMENTS

CN 1831847 9/2006
EP 1521161 A2 4/2005
(Continued)

OTHER PUBLICATIONS

Rattani, Adaptive Biometric System based on Template Update Procedures, a Dissertation Submitted to university of Cagliari, Mar. 31, 2010, Retrieved from the Internet: URL:http://www.diee.unica.it/DRIEI/testi/22rattani.pdf on Oct. 10, 2014, 149 pages.

(Continued)

*Primary Examiner* — Sarah Su
(74) *Attorney, Agent, or Firm* — Brownstein Hyatt Farber Schreck, LLP (57) ABSTRACT

An electronic device can include a processing device operatively connected to a biometric sensing device. The biometric sensing device may capture a biometric image each time a user interacts with the electronic device. When the user enters user identification data (UID) and a biometric image was recently captured, the biometric image is tagged with the UID. The user can access the electronic device and/or an application being accessed on the electronic device when a subsequently captured biometric image matches a tagged biometric image or an untagged biometric image that is assigned to a cluster that includes a tagged biometric image.

21 Claims, 7 Drawing Sheets

(51) Int. Cl.
*G06F 17/30* (2006.01)
*G07C 9/00* (2006.01)
*G06K 9/00* (2006.01)
*G06K 9/62* (2006.01)

(52) U.S. Cl.
CPC ....... *G06K 9/0002* (2013.01); *G06K 9/00087* (2013.01); *G06K 9/6218* (2013.01); *G07C 9/00158* (2013.01); *G06F 2221/2117* (2013.01)

(56) References Cited

U.S. PATENT DOCUMENTS

| | | | |
|---|---|---|---|
| 6,125,192 | A | 9/2000 | Bjorn |
| 6,323,846 | B1 | 11/2001 | Westerman et al. |
| 6,570,557 | B1 | 5/2003 | Westerman et al. |
| 6,677,932 | B1 | 1/2004 | Westerman |
| 6,876,757 | B2 | 4/2005 | Yau et al. |
| 6,888,536 | B2 | 5/2005 | Westerman et al. |
| 7,260,246 | B2 | 8/2007 | Fujii |
| 7,310,432 | B2 | 12/2007 | Xu |
| 7,420,474 | B1 | 9/2008 | Elks et al. |
| 7,506,172 | B2 | 3/2009 | Bhakta |
| 7,599,530 | B2 | 10/2009 | Boshra |
| 7,609,941 | B2 | 10/2009 | Matsukawa et al. |
| 7,697,729 | B2 | 4/2010 | Howell et al. |
| 7,747,043 | B2 | 6/2010 | Kamata et al. |
| 7,925,063 | B2 | 4/2011 | Ishida et al. |
| 8,903,141 | B2 | 12/2014 | Heilpern |
| 8,972,299 | B2 | 3/2015 | Kelly |
| 9,047,506 | B2 | 6/2015 | Nishiguchi et al. |
| 9,348,987 | B2 | 5/2016 | Boshra |
| 2002/0129285 | A1 | 9/2002 | Kuwata et al. |
| 2004/0010697 | A1 | 1/2004 | White |
| 2005/0165684 | A1 | 7/2005 | Jensen et al. |
| 2006/0152636 | A1* | 7/2006 | Matsukawa ...... G08B 13/19667 348/715 |
| 2007/0052672 | A1 | 3/2007 | Ritter et al. |
| 2007/0100856 | A1 | 5/2007 | Ebbesen |
| 2007/0140145 | A1 | 6/2007 | Kumar et al. |
| 2009/0125413 | A1 | 5/2009 | Le Chevalier et al. |
| 2009/0167492 | A1 | 7/2009 | Madafferi et al. |
| 2009/0176566 | A1* | 7/2009 | Kelly ................ G07F 17/32 463/29 |
| 2010/0060417 | A1 | 3/2010 | Niinuma |
| 2010/0201485 | A1 | 8/2010 | Chou |
| 2011/0314285 | A1* | 12/2011 | Hirata ................ G06F 21/32 713/170 |
| 2012/0079581 | A1* | 3/2012 | Patterson ............ G06Q 20/206 726/7 |
| 2012/0154117 | A1 | 6/2012 | Nice et al. |
| 2012/0331566 | A1 | 12/2012 | Lection et al. |
| 2013/0136320 | A1* | 5/2013 | Nishiguchi ........ G06K 9/00295 382/118 |
| 2013/0138652 | A1* | 5/2013 | Bigdeli ............. G06K 9/00892 707/737 |
| 2013/0207779 | A1 | 8/2013 | Uno et al. |
| 2013/0272586 | A1 | 10/2013 | Russo |
| 2013/0278383 | A1 | 10/2013 | Boshra |
| 2015/0071508 | A1 | 3/2015 | Boshra |
| 2015/0074615 | A1 | 3/2015 | Han et al. |
| 2015/0221151 | A1* | 8/2015 | Bacco ................ G07C 9/00158 340/5.83 |
| 2016/0125223 | A1* | 5/2016 | Boshra ............... G06K 9/00087 382/124 |

FOREIGN PATENT DOCUMENTS

| | | |
|---|---|---|
| TW | 1249709 | 2/2006 |
| TW | 200928993 | 7/2009 |
| TW | 201317904 | 5/2013 |
| TW | 201320709 | 5/2013 |
| WO | WO 05/034021 | 4/2005 |

OTHER PUBLICATIONS

Author Unknown, "Best Practices for Implementing Fingerprint Biometrics in Applications," A DigitalPersona Whitepaper, Aug. 2009, retrieved from the internet on Sep. 27, 2013, URL:http://web.archive.org/web/20111119172924/htt;://planetbiometrics.com/creo_files/upload/article-files/DP-wp-appbestpractices2009-08-21.pdf, 12 pages.

Jain, et al., "Fingerprint Mosaicking," *IEEE International Conference on Acoustics, Speech, and Signal Processing Proceedings* (ICASSP), May 13-17, 2002, Orlando, Florida, 4 pages.

Jiang, et al. "Online Fingerprint Template Improvement," *IEEE Transactions on Pattern Analysis and Machine Intelligence*, vol. 24, No. 8, Aug., 2002, pp. 1121-1126.

Uz, et al., "Minutiae-based template synthesis and matching for fingerprint authentication," *Computer Vision and Image Understanding*, vol. 113, 2009, pp. 979-992.

* cited by examiner

BACKGROUND ENROLLMENT AND AUTHENTICATION OF A USER

CROSS-REFERENCE TO RELATED APPLICATION

This application is a continuation-in-part of U.S. patent application Ser. No. 14/022,110, filed Sep. 9, 2013, and entitled "Background Enrollment and Authentication of a User," which is incorporated herein by reference as if fully disclosed herein.

TECHNICAL FIELD

The present invention relates to electronic devices, and more particularly to a biometric sensing device included in, or connected to an electronic device.

BACKGROUND

Biometric devices are increasingly common in computer or network security applications, financial applications, and surveillance applications. Biometric devices detect or image a unique physical or behavioral trait of a person, providing biometric data that can reliably identify the person. For example, a fingerprint includes a unique pattern of ridges and valleys that can be imaged by a fingerprint sensor. The image of the fingerprint, or the unique characteristics of the fingerprint, is compared to previously captured reference data, such as a reference fingerprint image. The identity of the person is obtained or verified when the newly captured fingerprint image matches the reference fingerprint image.

Typically, a user has to enroll reference biometric data that will be used for authentication. For example, a user may have to enroll one or more fingerprints before he or she can use the fingerprints for authentication. During the enrollment process, an image of each fingerprint that will be used for authentication is acquired and extracted features of the fingerprint are stored in a memory. The extracted features can then be used as reference fingerprint data during the authentication process. In some situations, however, the user may have to scan a fingerprint a number of times to obtain a fingerprint image that has adequate fingerprint coverage and an acceptable resolution. For example, a user may move or shift the finger during image capture, which can produce a blurry fingerprint image. Alternatively, contaminants such as dirt and water may be present on the finger being scanned, which can adversely affect the fingerprint image and/or the ability of the fingerprint sensor to obtain a fingerprint image. These and other challenges can be exacerbated when a user has to enroll multiple fingerprints.

Even after enrolling the biometric data and using a biometric sensing device to authenticate the identity of a user, a user may still be required to enter a password or pin when the user wants to access an application, a website, or another device. Thus, a user may be required to repeatedly enter pins or passwords when the user launches or switches applications, functions, and websites.

SUMMARY

Embodiments described herein acquire biometric images in the background as a user interacts naturally with an electronic device. Authentication of the user can also be done in the background using a newly captured biometric image and a previously captured biometric data that is tagged with user identification data (UID) such as a password or pin. A biometric sensing device can be operatively connected to a processing device in an electronic device, such as a processing device in a laptop computer, a tablet computing device, and a smart telephone. In some embodiments, the biometric sensing device can be positioned at a location that a user's physical or behavioral trait is naturally detectable, in contact with, or in close proximity to as the user interacts with the electronic device. A method for authenticating a user can include capturing at a first time a first biometric image when the user interacts with the electronic device and tagging the first biometric image with a UID that is associated with the user. The UID can be a pin or a password that the user entered within a given time period around the time the first biometric image is captured. Subsequently, a second biometric image can be captured and a determination made as to whether the second biometric image matches the first biometric image tagged with the first UID. The user can be given access to the electronic device and/or to an application being accessed on the electronic device when the second biometric image matches the tagged first biometric image. The application can be an application, a website, an account, and the like that requires the user to enter the UID for access.

In another aspect, a method for authenticating multiple users of an electronic device that includes a biometric sensing device can include capturing a first biometric image when a first user interacts with the electronic device and tagging the first biometric image with a first UID that is associated with the first user. The first biometric image tagged with the first UID can be assigned to a cluster associated with the first user. Each cluster associated with the first user can be associated with a respective biometric attribute of the user. For example, when the biometric sensing device is a fingerprint sensor, each cluster associated with the first user can correspond to a respective finger of the first user. A second biometric image can be captured when the first user again interacts with the electronic device. The first user can be given access to the electronic device or to an application being accessed on the electronic device when the second biometric image matches the first biometric image tagged with the first UID. The authentication process is similar for a second user, except that a biometric image is tagged with a UID associated with the second user, and the tagged biometric image can be assigned to a cluster associated with the second user.

In some embodiments, the biometric images can be fingerprint images. The fingerprint images can be captured when a finger or fingers of the user are in close proximity to, or in contact with an input region of the fingerprint sensor. The fingerprint sensor can be positioned at a location on the electronic device that a user's finger, fingers, and/or hand is naturally in contact with as the user interacts with the electronic device.

In yet another aspect, an electronic device can include a processing device operatively connected to a biometric sensing device. The biometric sensing device can be configured to capture biometric images when a user interacts with the electronic device. The processing device can be configured to receive each biometric image and tag at least one biometric image with a user identification data (UID) that is associated with the user. The processing device can be configured to determine if a newly captured biometric image matches at least one biometric image tagged with the UID, and if a match exists, provide access to the user to the electronic device and/or an application being accessed on the electronic device.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein acquire biometric images in the background as a user interacts naturally with an electronic device. Authentication of the user can also be done in the background using a newly captured biometric image and a previously captured biometric image that is tagged with user identification data (UID) such as a password or pin. Thus, in some embodiments, the user does not have to undergo an explicit enrollment process. The biometric sensing device incrementally captures biometric images and groups the images into clusters. As one example, when the biometric sensing device is a fingerprint sensor, the fingerprint images in a cluster can all correspond to the same finger.

In some embodiments, a biometric image captured within a given time period around the time when a user enters a pin, password, or some other user identification data (UID) can be tagged with the UID. Newly captured biometric images can be compared to the biometric images in each cluster to determine if the newly captured biometric image matches at least one biometric image in a cluster. If the newly captured biometric image matches a previously captured biometric image, and the previously captured biometric image is tagged with a UID that is associated with the user, the identity of the user is authenticated and the user can be provided access to the electronic device or to an application being accessed on the electronic device.

Any suitable type of biometric sensing device can be included in, or connected to an electronic device. A person's fingerprint, eye, DNA, vein patterns, typing speed or patterns, gait, voice, face, and heart or brain signals are examples of a physical characteristic or a behavioral trait that can be detected or imaged by a biometric sensing device. A biometric sensing device can employ capacitance, ultrasonic, optical, resistive, thermal, or other sensing technologies to detect or image a biometric attribute. The term "biometric attribute" is meant to encompass a physical or behavioral trait that can be detected by a biometric sensing device.

As used herein, the terms "image" and "biometric image" includes an image and other types of data that can be captured by a biometric sensing device. The term "fingerprint image" includes an image and other types of data that can be captured by a fingerprint sensor. By way of example only, a fingerprint sensor can produce a data structure that defines the features in a fingerprint. Additionally, the term "fingerprint image" is meant to encompass an image or other data relating to a fingerprint of some or all of one or more fingers, some or all of a palm, some or all of a hand, and various combinations thereof. The term "finger" is meant to encompass one or more fingers, some or all of a palm, some or all of a hand, and various combinations thereof.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

Figure 1:
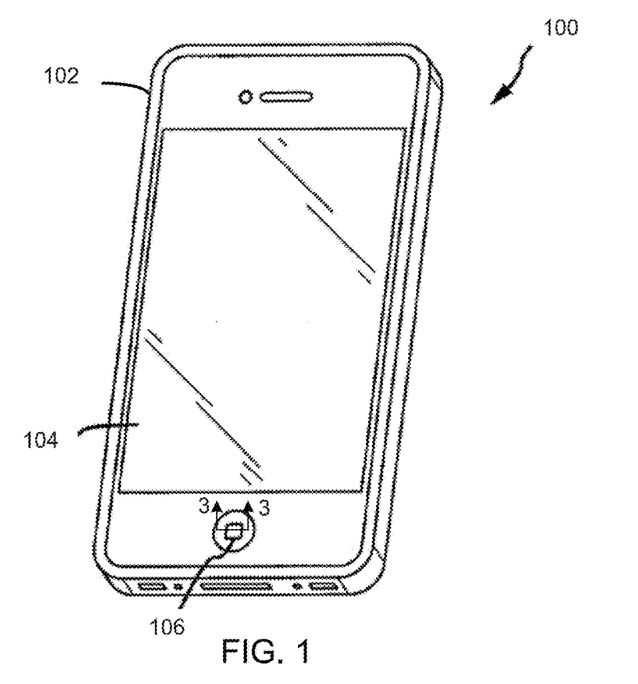
FIG. 1 is a perspective view of an example electronic device that can include, or be connected to a biometric sensing device.

Referring now to FIG. 1, there is shown a perspective view of one example of an electronic device that can include, or be connected to a biometric sensing device. In the illustrated embodiment, the electronic device 100 is implemented as a smart telephone. Other embodiments can implement the electronic device differently, such as, for example, as a laptop or desktop computer, a tablet computing device, a gaming device, a wearable computing device or display, a display, a digital music player, and other types of electronic devices that include, or be connected to a biometric sensing device.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display or on an input region, and so on. Further, in some embodiments, the button 106 can be integrated as part of a cover glass of the electronic device.

Figure 2:
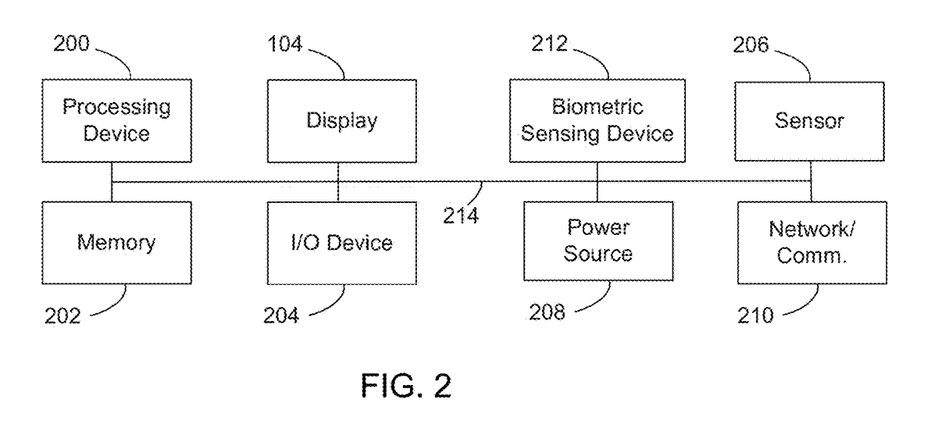
FIG. 2 is an illustrative block diagram of the electronic device 100 shown in FIG. 1.

FIG. 2 is an illustrative block diagram of the electronic device 100 shown in FIG. 1. The electronic device 100 can include the display 104, a processing device 200, memory 202, an input/output (I/O) device 204, a sensor 206, a power source 208, a network communications interface 210, and a biometric sensing device 212. The display 104 may provide an image or video output for the electronic device 100. The display may also provide an input surface for one or more input devices, such as, for example, a touch sensing device and/or a fingerprint sensor. The display 104 may be substantially any size and may be positioned substantially anywhere on the electronic device 100.

The processing device 200 can control some or all of the operations of the electronic device 100. The processing device 200 can communicate, either directly or indirectly, with substantially all of the components of the electronic device 100. For example, a system bus or signal line 214 or other communication mechanisms can provide communication between the processing device 200, the memory 202, the I/O device 204, the sensor 206, the power source 208, the network communications interface 210, and/or the biometric sensing device 212. The processing device 200 can be implemented as any electronic device capable of processing, receiving, or transmitting data or instructions. For example, the processing device 200 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing signals, biometric images, data structures or databases, and so on. The memory 202 can be configured as any type of memory. By way of example only, the memory can be implemented as random access memory, read-only memory, Flash memory, removable memory, or other types of storage elements, or combinations of such devices.

The I/O device 204 can transmit and/or receive data to and from a user or another electronic device. One example of an I/O device is button 106 in FIG. 1. The I/O device(s) 204 can include a display, a touch sensing input surface such as a trackpad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, movement, relative motion, biometric data, and so on. For example, the sensor(s) 206 may be an image sensor, a heat sensor, a light or optical sensor, an accelerometer, a pressure transducer, a gyroscope, a magnet, a health monitoring sensor, and so on.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The biometric sensing device 212 can be implemented as any suitable biometric sensor, scanner, and/or system. For example, the biometric sensing device can be a facial recognition device, an iris or retina scanner, a vein recognition device that can image the veins in a finger or palm, a facial biometrics scanner, and/or a thermal imaging scanner. In embodiments described herein, the biometric sensing device can be one or more fingerprint sensors. The fingerprint sensor can capture images one or more fingers, a portion of one or more fingers, and/or some or all of a palm or of a hand. In some embodiments, the fingerprint sensor is positioned at a location that a user's finger, fingers and/or hands are naturally in contact with as the user interacts with the electronic device. For example, an electronic device can include a fingerprint sensor in the display 104, the button 106, the enclosure 102, and/or as a separate electronic device that is connected to the electronic device 100. Additionally, the fingerprint sensor can be implemented with any suitable sensing technology, including, but not limited to, capacitive, resistive, ultrasound, piezoelectric, and thermal sensing technology.

It should be noted that FIGS. 1 and 2 are illustrative only. In other examples, an electronic device may include fewer or more components than those shown in FIGS. 1 and 2.

Figure 3:
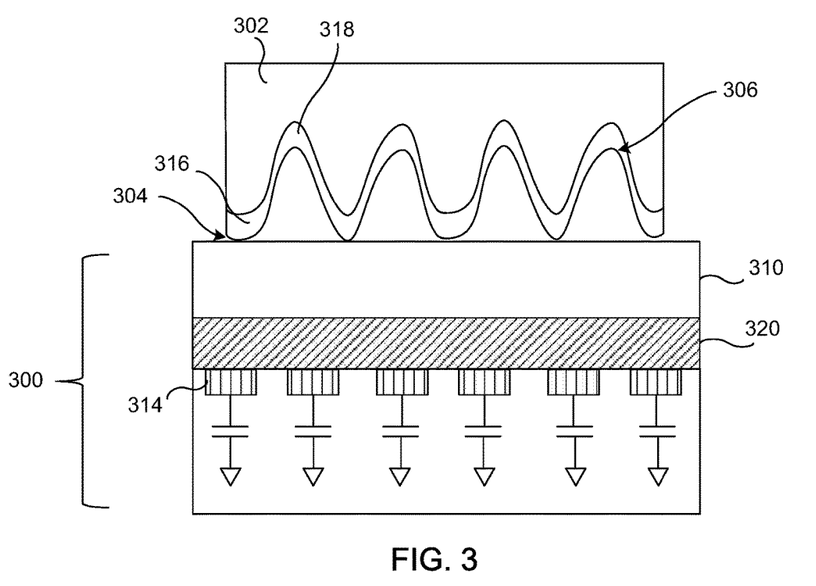
FIG. 3 depicts an enlarged and simplified cross-section view of a portion of a fingerprint sensor taken along line 3-3 in FIG. 1.

A fingerprint sensor will be used to describe various embodiments, with the fingerprint sensor including a capacitive fingerprint sensor. One example construction of a capacitive fingerprint sensor and how the capacitive fingerprint sensor captures a fingerprint is now briefly described. FIG. 3 illustrates an enlarged and simplified cross-section view of a portion of a fingerprint sensor taken along line 3-3 in FIG. 1. A first layer 310 can be disposed over a dielectric layer 320. By way of example only, the first layer 310 can be a dielectric layer such as an exterior surface of a button or other input device (e.g., button 106 in FIG. 1), an exterior surface of an input device such as a trackpad or mouse, and/or a cover glass of a display (e.g., display 104 in FIG. 1). In some embodiments, the dielectric layer 320 can be a color layer that can be used to reduce the visibility of the electrodes and other circuitry of the fingerprint sensor.

The capacitive fingerprint sensor 300 can capture a fingerprint image of at least a portion of the finger 302 by measuring capacitance differences between the finger 302 and the electrodes 314. A fingerprint is generally formed from ridges 304 and valleys 306 arranged in a unique pattern. Typically, the capacitance measured between a ridge 304 and one or more electrodes 314 varies from the capacitance measured between a valley 306 and one or more electrodes 314. The measured capacitance between a ridge and an electrode can be greater than the measured capacitance between a valley and an electrode because the ridge is closer to the electrode. The differences in the measured capacitances can be used to distinguish between ridges and valleys and produce a fingerprint image.

The skin on the finger 302 includes a dead skin layer 316 disposed over a live skin layer 318. The capacitive fingerprint sensor 300 typically images the dead skin layer 316 to obtain an image of the fingerprint. However, if a portion of the dead skin layer 316 is damaged or missing, the capacitive fingerprint sensor can obtain an image of the fingerprint by imaging the live skin layer 318 by itself, or by imaging both the remaining dead skin layer 316 and the exposed live skin layer 318.

Figure 4:
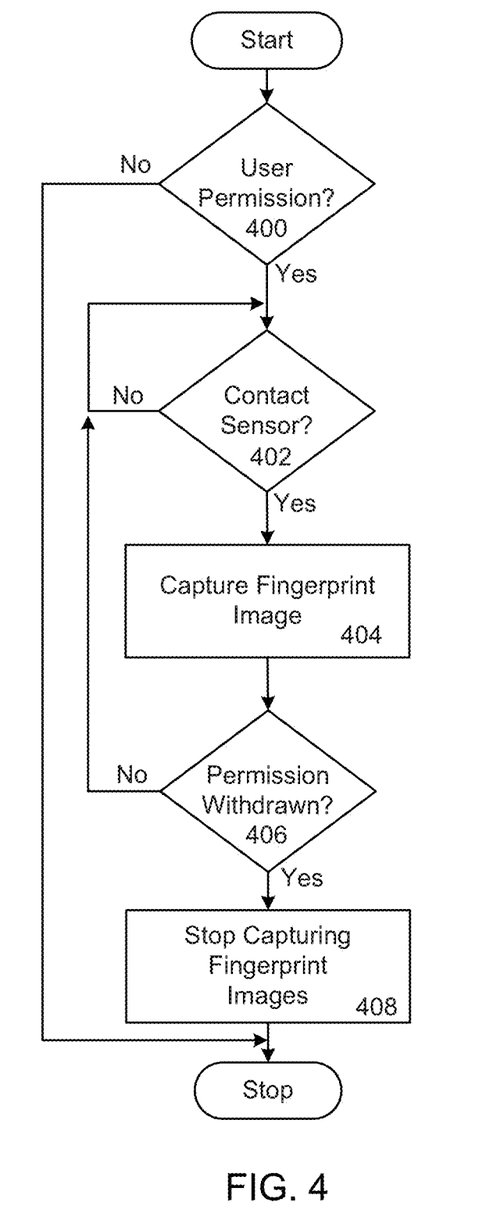
FIG. 4 is a flowchart of a method capturing fingerprint images.

Referring now to FIG. 4, there is shown a flowchart of a method capturing fingerprint images. The fingerprint images can be captured in the background while a user interacts naturally with an electronic device, thereby reducing or eliminating the need to perform an explicit fingerprint enrollment process. Initially, a determination is made at block 400 as to whether or not a user has given their permission for the fingerprint sensor to capture fingerprint images in the background. By way of example only, a user can grant permission through a setting associated with the fingerprint sensor, and/or the user can be asked if he or she wants the fingerprint sensor to capture images in the background during a setup process that can occur when the user first uses the electronic device. The method ends if the user does not give permission.

When a user has granted permission to capture his or her fingerprint images in the background, the process passes to block 402 where a determination is made as to whether the user, or a finger of the user, has contacted an input region of the fingerprint sensor. As one example, an input region of a fingerprint sensor can be the exterior surface of button 106 in FIG. 1. Additionally or alternatively, an input region can be a predetermined location on the display 104, or the input region can be any location on the entire display 104. In some embodiments, a fingerprint sensor can capture a fingerprint image when a finger is in contact with, or in close proximity to, the input region of the fingerprint sensor. If the user has not contacted the input region, the method waits at block 402 until the user contacts the input region of the fingerprint sensor.

When the user contacts the input region of the fingerprint sensor, the process continues at block 404 where a fingerprint image is captured. A determination is then made at block 406 as to whether the user has withdrawn his or her permission to acquire fingerprint images in the background. If not, the method returns to block 402. When the user withdraws his or her permission, the fingerprint sensor ceases to capture fingerprint images in the background (at block 408) and the method ends.

Figure 5:
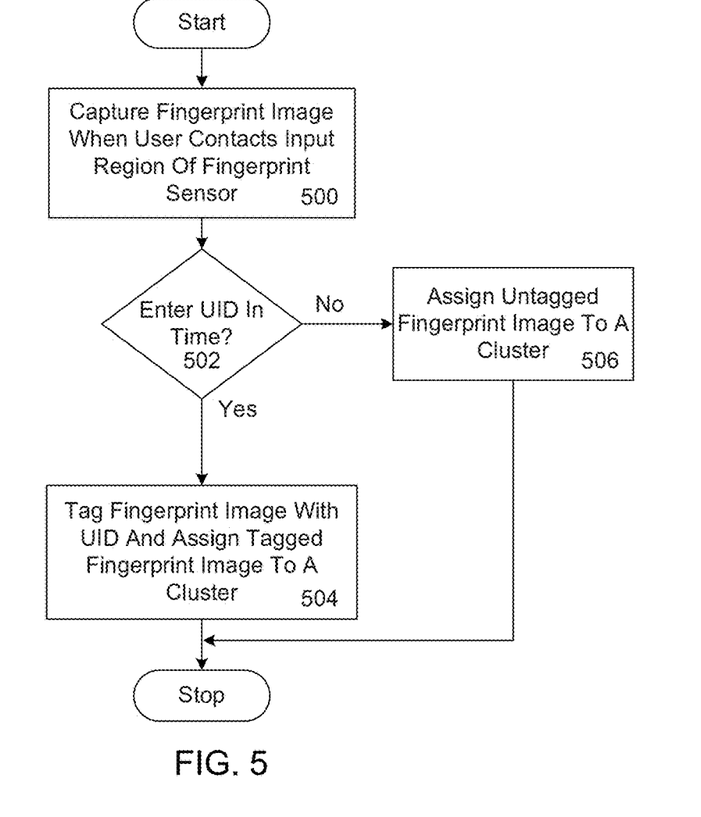
FIG. 5 is a flowchart of a method for associating a fingerprint image captured in the background with a user.

FIG. 5 is a flowchart of a method for associating a fingerprint image captured in the background with a user. The illustrated method can be performed after a user has given permission for the fingerprint sensor to capture fingerprint images in the background. Initially, at block 500, a fingerprint image can be captured when the user contacts (or is in close proximity to) the input region of the fingerprint sensor. A determination is then made at block 502 as to whether the user has entered user identification data (UID) within a given period of time around the time the fingerprint image is captured. The given time period can be a predetermined time period or a user can select the time period. The UID can be a pin or password in some embodiments. For example, a pin or password can be used to unlock the electronic device or to access to an application or a website using the electronic device.

If the UID is entered within the given time period, the process continues at block 504 where the fingerprint image is tagged with the UID and the tagged fingerprint image is assigned to a cluster. When the user does not enter a UID within the given time period, the method passes to block 506 where the untagged fingerprint image is assigned to a cluster. In one embodiment, multiple clusters can be created, with each cluster containing one or more fingerprint images for a respective finger. Thus, one cluster can contain fingerprint images of one finger (e.g., the left index finger) while another cluster can include fingerprint images of another finger (e.g., the right index finger).

In other embodiments, a cluster can include fingerprint images based on different criterion. As one example, clusters can correspond to different parts of the same finger. One cluster can include images associated with the tip of a finger while another cluster includes images that correspond to a core area of the same finger.

Figure 6:
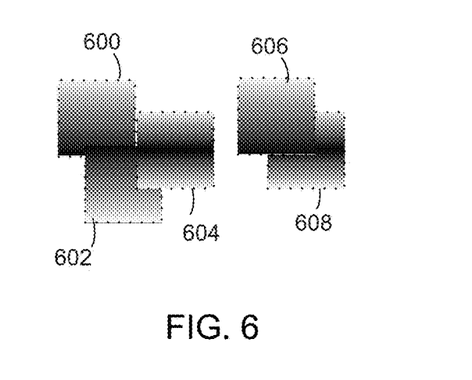
FIG. 6 illustrates one method for assigning fingerprint images to a cluster.

In some embodiments, a new fingerprint image can be assigned to a cluster when the newly captured fingerprint image matches a previously captured fingerprint image. The previously captured fingerprint image may or may not be tagged with the UID. FIG. 6 illustrates one method for assigning fingerprint images to a cluster. As described earlier, a number of fingerprint images 600, 602, 604, 606, and 608 can be assigned to a cluster when the fingerprint images correspond to the same finger. A newly captured fingerprint image can be compared and cross-matched to all of the previously captured fingerprint images. When the new fingerprint image is matched to at least a portion of an existing fingerprint image in a cluster, then the new fingerprint image is included in that cluster.

Those skilled in the art will recognize that the other embodiments can perform the method shown in FIG. 5 differently. As one example, fingerprint images that are not tagged with a UID can be deleted and not assigned to a cluster. In this embodiment, the clusters are limited to tagged fingerprint images. In another embodiment, untagged fingerprint images can be assigned to different clusters than tagged fingerprint images. Thus, the fingerprint images in each cluster will include only tagged fingerprint images or only untagged fingerprint images.

The method of FIG. 5 will now be described with reference to an example application. When a user enables a passcode locking feature in an electronic device, such as in a smart telephone, the user must enter a pin or some other UID to unlock the electronic device. The unlock procedure can include the user first pressing a button (e.g., button 106 in FIG. 1) and then entering a pin. When a fingerprint sensor is included in the button, a fingerprint image can be acquired when the user presses the button. If the user enters the pin within a given time period after pressing the button, the fingerprint image that was captured when the user pressed the button is tagged with the pin and assigned to a cluster (e.g., the cluster for the finger used to press the button). Subsequently, the next time the user wants to unlock the electronic device, the user presses the button and another fingerprint image is captured. If the newly captured fingerprint image matches the fingerprint image tagged with the pin, the electronic device is unlocked immediately. The user does not have to enter the pin to unlock the electronic device.

Figure 7:
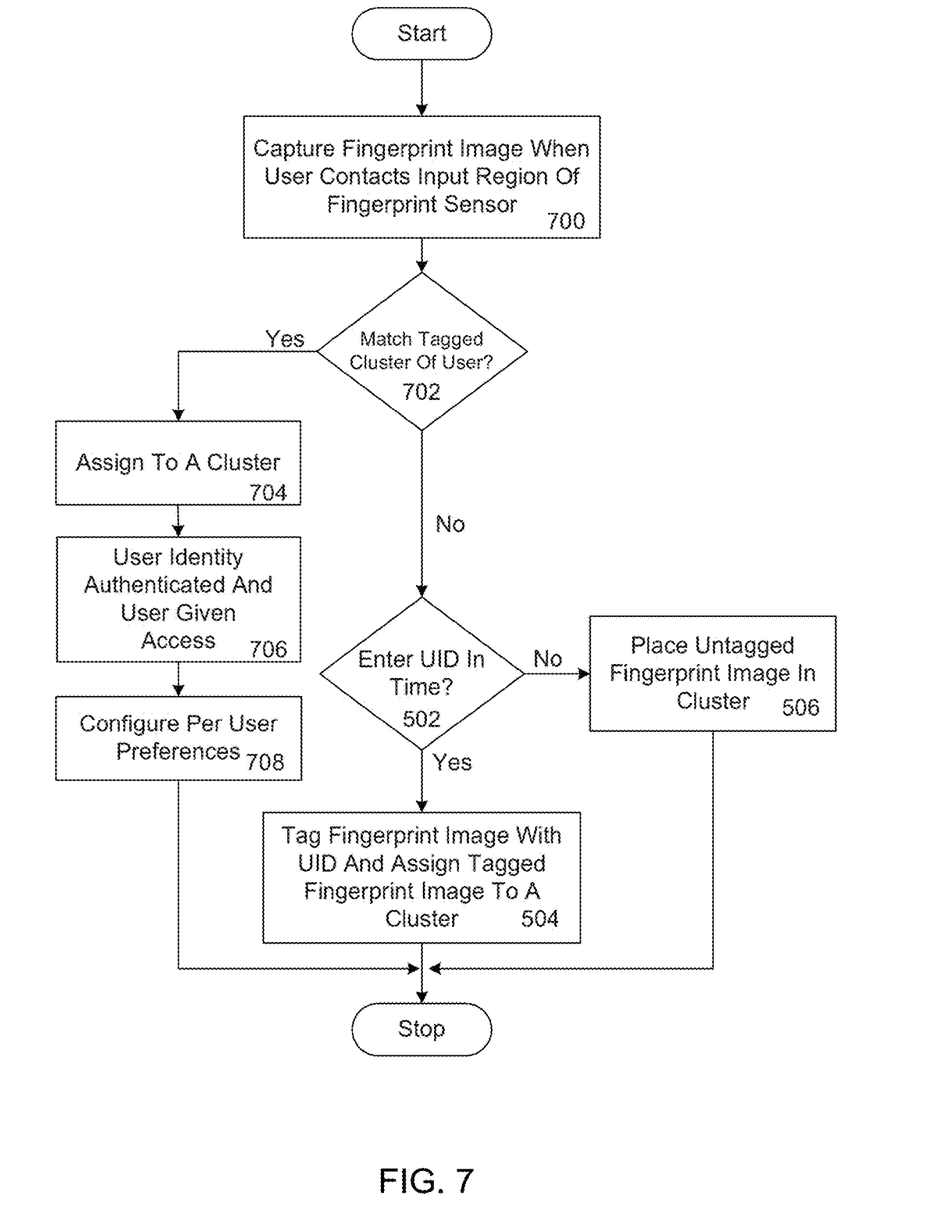
FIG. 7 is a flowchart of a method for authenticating a user using a previously captured and tagged fingerprint image.

Referring now to FIG. 7, there is shown a method for authenticating a user using a previously captured and tagged fingerprint image. Initially, a fingerprint image is captured at block 700 when a finger of a user is in contact with, or is in close proximity to, an input region of the fingerprint sensor. As one example, a user can press a button or a key on a keyboard, an exterior surface of a button, a trackpad, or a mouse. The user can be unlocking the electronic device, opening an application, entering a website address, or switching from one application to another application.

A determination is then made at block 702 as to whether the newly captured fingerprint image matches a tagged cluster. In one embodiment, the newly captured fingerprint image may match a tagged fingerprint image in a cluster. In another embodiment, the newly captured fingerprint image can match an untagged fingerprint image in a cluster that includes at least one tagged fingerprint image.

Additionally, in some embodiments, multiple users can interact with the same electronic device. When more than one user has given his or her permission to capture fingerprint images in the background, one or more clusters can be associated with each user. Thus, in block 702, the determination as to whether the newly captured fingerprint image matches a tagged cluster can be limited to those clusters that are associated with the current user of the electronic device. Other embodiments can compare and cross-match the newly captured fingerprint image with fingerprint images in all of the tagged clusters.

If the newly captured fingerprint image matches a tagged cluster, the process passes to block 704 where the newly captured fingerprint image can be assigned to a cluster. At block 706, the identity of the user is authenticated and the user is given access to the electronic device, or to the application being accessed on the electronic device. Thus, the step of entering in a UID can be eliminated. The user does not have to enter a UID to have access to the device, application, or website when the newly captured fingerprint image matches a tagged cluster.

Next, as shown in block 708, the electronic device, application, and/or website can be configured for the current user based on his or her preferences. For example, when a user unlocks an electronic device, the home screen, icons, wallpaper, and other features can be presented to the user based on his or her preferences. Thus, multiple users of a single electronic device, such as a family tablet computer, can each view the home screen, applications, and other functions as specified by that user. As one example, the bookmarks in a web browsing application can be provided to each user based on their individually selected bookmarks. Additionally, the icons, as well as the layout of the icons, can be displayed to each user based on their preferences.

Returning again to block 702, if the newly captured image does not match a tagged cluster, the method continues at block 502. Blocks 502, 504, and 506 can be performed as described earlier in conjunction with FIG. 5. The method of FIG. 7 ends after the newly captured fingerprint image is assigned to a cluster.

Other embodiments can perform the method shown in FIG. 7 differently. Blocks can be added, performed in a different order, and/or some blocks can be omitted. For example, in some embodiments, block 704 and/or block 708 can be omitted.

One example of a multi-user environment will now be described. Several family members can share a tablet computing device and each family member can have his or her own account on a social networking website. Over time, as the family members interact naturally with the tablet, fingerprint images of each family member can be acquired automatically and in the background, and the fingerprint images of the family members tagged with their respective UIDs for their social networking accounts. The tagged fingerprint images can be assigned to clusters associated with each family member. User authentication can then be done in the background, with the user given access to his or her social networking account without having to enter a password. A new fingerprint image of a family member currently using the electronic device can be captured when the user opens the social networking website and/or when the user switches to the social networking website. If the new fingerprint image matches a tagged cluster for the social networking account, and optionally that tagged fingerprint image is assigned to a cluster associated with that family member, the social networking account can be opened and made accessible to the user immediately. Thus, the social networking account may be opened using a tagged cluster and not by the user entering his or her UID (e.g., password).

Additionally, in some embodiments, a second family member who is trying to log into his or her social network account when another family member unlocked the device may not be able to do so because his or her fingerprint images will not match any of the fingerprint images in the cluster(s) associated with the family member that unlocked the device. In other embodiments, when the review is not limited to the clusters associated with the family member that unlocked the electronic device and all of the tagged clusters are reviewed, the second family member may be given access to his or her social network account immediately if their fingerprint image matches a tagged cluster.

Figure 8:
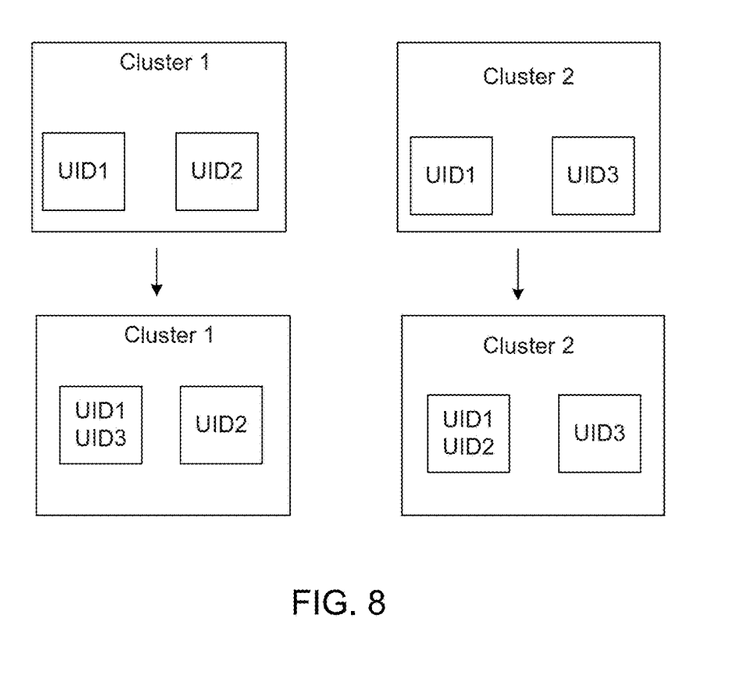
FIGS. 8-9 depict methods for combining fingerprint images or UIDs in different clusters.
Figure 9:
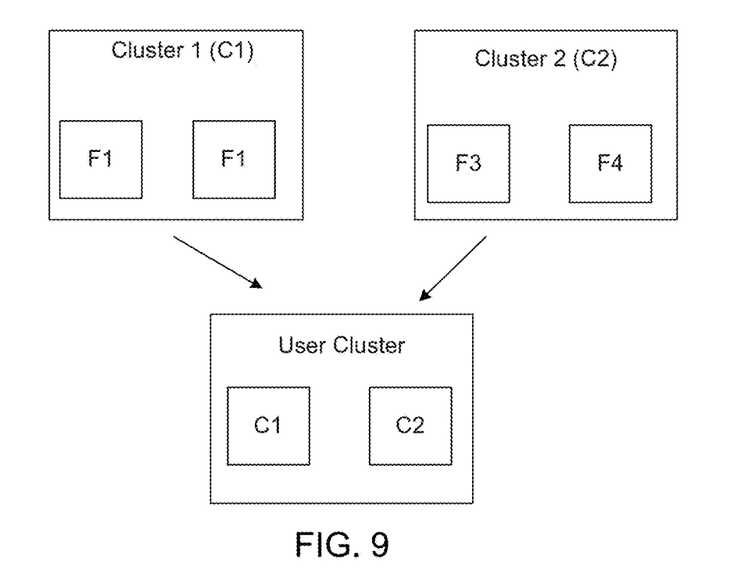

A cluster can be a connected component of a set of images. For example, a cluster can correspond to data from a single finger only, or a cluster can correspond to a single user. FIGS. 8-9 depict methods for combining fingerprint images or tags in different clusters. FIG. 8 depicts two clusters, cluster 1 and cluster 2. Cluster 1 includes two tagged fingerprint images; one image is tagged with a first UID and the other fingerprint image with a second UID. As one example, the first UID can be associated with a passcode used to unlock the device while the second UID with a website, such as an online banking website.

Cluster 2 also includes two tagged fingerprint images; one image is tagged with the first UID and the other fingerprint image with a third UID. As another example, the third UID can be associated with another website, such as a social networking website.

Because one fingerprint image in both clusters is tagged with the first UID tag, the UID2 and UID3 tags can migrate to the other respective cluster. The third UID tag can migrate to cluster 1 while the second UID tag can migrate to cluster 2. Both cluster 1 and cluster 2 have three UID tags instead of the initial two UID tags.

In some embodiments, two clusters that are associated with the same user can be assigned to a user cluster. For example, Cluster 1 can include multiple fingerprint images F1 and F2 associated with the same finger with the same part of the same finger. Cluster 2 can include multiple fingerprint images F3 and F4 that are associated with a different or with a different part of a different finger. Cluster 1 and cluster 2 can be assigned to the same user cluster when the two clusters are associated with the same user. Thus, a user cluster can include several finger clusters of the same user.

And in yet another embodiment, two or more clusters can be merged into one cluster when a new fingerprint image matches at least one image in each cluster. As one example, two clusters can be merged into a single cluster when the two clusters correspond to different parts of the same finger.

Figure 10:
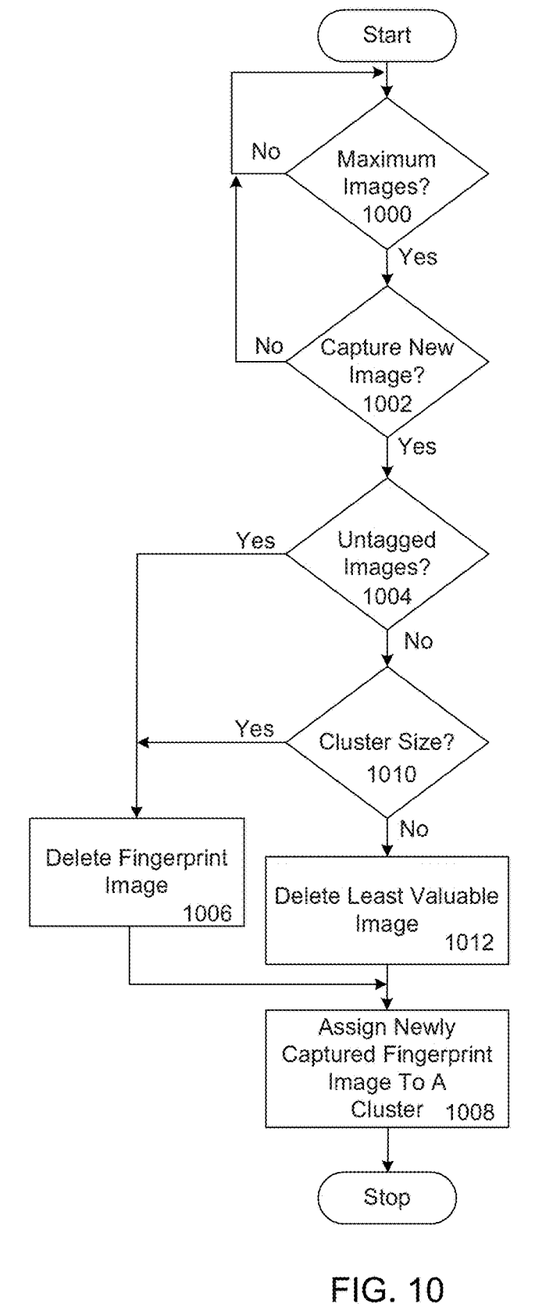
FIG. 10 is a flowchart of a method for deleting fingerprint images.

Referring now to FIG. 10, there is shown a flowchart of a method for deleting fingerprint images. In some embodiments, only a predetermined number of fingerprint images can be saved and assigned to one or more clusters. The method shown in FIG. 10 can be performed when a new fingerprint image is acquired and the maximum number of fingerprint images has been captured and stored. This embodiment considers only untagged fingerprint images, the size of a cluster, and the extent of overlap in overlapping fingerprint images when deleting fingerprint images. Other embodiments can consider additional or different factors, such as the quality of a fingerprint image and/or the fingerprint images associated with the least used UID tags. As another example, tagged fingerprint images can be deleted in embodiments that associated tags to the cluster or clusters that include the tagged fingerprint images.

Initially, a determination is made as to whether the maximum number of fingerprint images has been captured. If not, the method waits until the maximum number of fingerprint images is captured and stored. When the maximum number of fingerprint images is saved, the process passes to block 1002 where a determination is made as to whether a new fingerprint image has been captured. If not, the method returns to block 1000.

When a new fingerprint image is captured, the process continues at block 1004 where a determination can be made as to whether any untagged fingerprint images are stored in one or more clusters. If so, at least one untagged fingerprint image can be deleted at block 1006 and the method passes to block 1008 where the newly captured fingerprint image can be assigned to a cluster. The method can end after the newly captured fingerprint image is assigned to a cluster.

If there are no untagged fingerprint images stored in one or more clusters, the method continues at block 1010 where a determination is made as to whether fingerprint images are to be deleted from a cluster having the fewest number of fingerprint images. If so, at least one fingerprint image in the cluster with the fewest number of fingerprint images can be deleted and the newly captured fingerprint image assigned to a respective cluster (blocks 1006 and 1008).

When fingerprint images are not to be deleted from a cluster having the fewest number of fingerprint images, the process passes to block 1012 where one or more least valuable images are deleted. In some embodiments, a fingerprint image can be considered less valuable when the fingerprint image does not contribute additional information to the cluster. The newly captured image can then be saved and assigned to the same cluster or to a different cluster at block 1008.

As described previously, biometric sensing devices other than fingerprint sensors can be included or connected to an electronic device. Thus, images or data relating to other types of biometric attributes can be used in other embodiments. For example, a user's face, veins, retina, iris, and thermal images can be captured in the background as the user interacts with the electronic device. Additionally, images or data of the biometric attributes can be used to authenticate a user in the background.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. A method for authenticating a user of an electronic device that includes a biometric sensing device, the method comprising:
   capturing, at a first time, as part of background operations of the electronic device, a first biometric image as the user interacts with the electronic device;
   receiving first user identification data (UID) from the user as the user interacts with the electronic device;
   tagging the first biometric image with the first UID when the first biometric image and the first UID are received within a given time period of each other;
   if the first biometric image and the first UID are received within the given time period of each other, assigning the tagged first biometric image to a cluster, wherein the cluster comprises one or more biometric images associated with a respective biometric attribute of the user;
   if the first biometric image and the first UID are not received within the given time period of each other, assigning the untagged first biometric image to the cluster;
   capturing, at a second time, as part of the background operations of the electronic device, a second biometric image as the user interacts with the electronic device;
   determining if the second biometric image matches the first biometric image in the cluster; and
   providing the user with automatic access to the electronic device or to the application on the electronic device only when the second biometric image matches the first biometric image and the first biometric image is tagged with the first UID.

2. The method as in claim 1, further comprising:
assigning the second biometric image to the cluster when the second biometric image matches the first biometric image in the cluster;
capturing, at a third time, as part of the background operations of the electronic device, a third biometric image as the user interacts with the electronic device;
determining if the third biometric image matches either the first biometric image or the second biometric image in the cluster; and
providing the user with automatic access to the electronic device or to the application on the electronic device only when the third biometric image matches the first biometric image and the first biometric image is tagged with the first UID.

3. The method as in claim 1, wherein the first and second biometric images each comprise a fingerprint image.

4. The method as in claim 1, further comprising tagging the second biometric image with a second UID when the second UID and the second biometric image are received within a given time period of each other.

5. The method as in claim 4, further comprising assigning the tagged second biometric image to the cluster when the second biometric image matches the first biometric image in the cluster.

6. The method as in claim 4, further comprising assigning the untagged second biometric image to the cluster when the second UID and the second biometric image are not received within the given time period and the untagged second biometric image matches the first biometric image in the cluster.

7. The method as in claim 4, wherein the second UID and the first UID comprise a same UID.

8. The method as in claim 4, further comprising assigning the second biometric image tagged with the second UID to a second cluster when the second biometric image does not match the first biometric image.

9. The method as in claim 1, further comprising:
prior to assigning the first biometric image tagged with the first UID to the cluster, determining if a maximum number of biometric images have been assigned to the cluster;
selecting one or more biometric images to be deleted when the maximum number of biometric images have been assigned to the cluster; and
deleting at least one biometric image from the cluster.

10. The method as in claim 9, wherein at least one biometric image is selected to be deleted based on an amount of contribution the at least one biometric image contributes to the cluster.

11. The method as in claim 1, further comprising:
repeatedly capturing, as part of the background operations of the electronic device, biometric images as the user interacts with the electronic device;
repeatedly tagging each biometric image with a respective UID when the respective UID and a respective biometric image are received within the given time period of each other;
storing each tagged or untagged biometric image in the cluster when the tagged or untagged biometric image matches the first biometric image in the cluster; and
storing each tagged or untagged biometric image in at least one different cluster when the tagged or untagged biometric image does not match the first biometric image in the cluster.

12. The method as in claim 11, wherein:
the cluster is a first cluster; and
the method further comprises:
determining whether the first cluster and a second cluster each include a biometric image tagged with a same UID;
if so, determining whether one of the first and second clusters includes a biometric image tagged with a different UID; and migrating the different UID into the cluster of the first and second clusters that does not include the different UID.

13. An electronic device, comprising:
a processing device;
a biometric sensing device operatively connected to the processing device, wherein the biometric sensing device is configured to capture, as part of background operations of the electronic device, biometric images as a user interacts with the electronic device and the processing device is configured to receive user identification data (UID) from the user as the user interacts with the electronic device and tags at least one of the biometric images with the UID when the at least one biometric image and the UID are received within a given time period of each other; and
a memory operatively connected to the processing device and to the biometric sensing device, the memory configured to store the tagged at least one biometric image in a cluster, the cluster comprising one or more biometric images associated with a respective biometric attribute of the user.

14. The electronic device as in claim 13, wherein the biometric sensing device comprises a fingerprint sensor.

15. The electronic device as in claim 14, wherein the fingerprint sensor is included in a button on the electronic device.

16. The electronic device as in claim 14, further comprising a display operatively connected to the processing device, wherein the fingerprint sensor is included in at least a portion of the display.

17. A method for authenticating multiple users of an electronic device that includes a biometric sensing device, the method comprising:
capturing, as part of background operations of the electronic device, a first biometric image as a first user interacts with the electronic device;
receiving first user identification data (UID) from a first the user as the first user interacts with the electronic device;
tagging the first biometric image with the first UID when the first biometric image and the first UID are received within a given time period of each other;
assigning the first biometric image tagged with the first UID to a first cluster associated with the first user, wherein the first cluster comprises the first biometric image tagged with the first UID and an untagged biometric image associated with the first user;
capturing, as part of the background operations of the electronic device, a second biometric image as the first user interacts with the electronic device; and
providing the first user with automatic access to the electronic device or to the application on the electronic device only when the second biometric image matches the first biometric image tagged with the first UID.

18. The method as in claim 17, further comprising:
receiving a second UID from the first user as the first user interacts with the electronic device;

tagging the second biometric image with the second UID when the second biometric image and the second UID are received from the first user within a given time period of each other;
assigning the tagged second biometric image to the first cluster;
capturing, as part of the background operations of the electronic device, a third biometric image as the first user interacts with the electronic device; and
providing the first user with automatic access to the electronic device or to the application on the electronic device only when the third biometric image matches either the first biometric image tagged with the first UID or the second biometric image tagged with the second UID in the first cluster.

19. The method as in claim 18, further comprising:
capturing, as part of the background operations of the electronic device, a fourth biometric image as a second user interacts with the electronic device;
receiving third user identification data (UID) from the second user as the second user interacts with the electronic device;
tagging the fourth biometric image with the third UID when the fourth biometric image and the third UID are received within a given time period of each other;
assigning the fourth biometric image tagged with the third UID to a second cluster associated with the second user, wherein the second cluster comprises the fourth biometric image tagged with the third UID and an untagged biometric image associated with the second user;
capturing, as part of the background operations of the electronic device, a fifth biometric image as the second user interacts with the electronic device; and
providing the second user with automatic access to the electronic device or to the application on the electronic device only when the fifth biometric image matches the fourth biometric image tagged with the third UID in the second cluster.

20. The method as in claim 19, further comprising:
receiving a fourth UID from the second user as the second user interacts with the electronic device;
tagging the fifth biometric image with the fourth UID when the fifth biometric image and the fourth UID are received from the second user within a given time period of each other;
assigning the fifth biometric image tagged with the fourth UID to the second cluster;
capturing, as part of the background operations of the electronic device, a sixth biometric image as the second user interacts with the electronic device;
determining if the sixth biometric image matches at least one biometric image in the second cluster; and
providing the second user with automatic access to the electronic device or to the application on the electronic device when the sixth biometric image matches either the tagged fifth biometric image or the tagged fourth biometric image in the second cluster.

21. The method as in claim 17, further comprising:
capturing, as part of the background operations of the electronic device, a seventh biometric image as the first user interacts with the electronic device;
determining if the seventh biometric image matches at least one biometric image in the first cluster; and
providing the first user with automatic access to the electronic device or to the application on the electronic device when the seventh biometric image matches either the tagged first biometric image or the tagged second biometric image in the first cluster.

* * * * *